United States Patent [19]
Chow

[11] Patent Number: 5,367,596
[45] Date of Patent: Nov. 22, 1994

[54] METHOD OF MAKING A MODULATED FIBER OPTIC IMAGE SCANNER

[76] Inventor: Vincent Chow, 7980 Kingsbury Dr., Hanover Park, Ill. 60103

[21] Appl. No.: 92,391

[22] Filed: Jul. 14, 1993

Related U.S. Application Data

[62] Division of Ser. No. 517,109, Apr. 30, 1990, Pat. No. 5,258,858.

[51] Int. Cl.$^5$ .................... G02B 6/06; B65H 55/04; B65H 69/02; B29D 11/00
[52] U.S. Cl. .................... 385/116; 385/115; 385/120; 385/121; 385/147; 242/1; 242/173; 242/178; 264/1.1; 264/1.24; 156/158; 156/159
[58] Field of Search .............. 385/100, 115, 116, 120, 385/121; 358/484, 474, 483, 482, 471, 496, 901; 250/227.11, 232; 156/158, 159, 160, 166, 167, 169, 173, 174, 175; 355/1; 264/1.1, 1.5, 1.6, 2.1, 2.3, 2.5; 242/1, 170, 178, 172, 173, 174

[56] References Cited

U.S. PATENT DOCUMENTS

| | | | |
|---|---|---|---|
| 3,430,057 | 2/1969 | Genahr | 250/227.11 X |
| 3,467,774 | 9/1969 | Bryant | 358/484 |
| 3,473,872 | 10/1969 | Okamura | 385/120 X |
| 3,493,292 | 2/1970 | Dostal | 359/237 X |
| 3,542,451 | 11/1970 | Washburn | 385/115 X |
| 3,603,730 | 9/1971 | Weigl et al. | 178/7.1 |
| 3,714,447 | 1/1973 | Jallais | 250/227.11 X |
| 3,732,367 | 5/1973 | Teranishi et al. | 178/6.8 |
| 3,781,555 | 12/1973 | Keefe | 385/116 X |
| 3,784,309 | 1/1974 | Brelot et al. | 356/156 |
| 3,821,732 | 6/1974 | Romney | 340/380 |
| 3,860,747 | 1/1975 | Orii et al. | 178/6 |
| 3,941,485 | 3/1976 | Madden | 356/159 |
| 3,999,860 | 12/1976 | Demsky et al. | 356/173 |
| 4,139,261 | 2/1979 | Hilsum | 385/120 X |
| 4,208,096 | 6/1980 | Glenn, Jr. | 385/120 X |
| 4,402,017 | 8/1983 | Takei | 358/484 |
| 4,413,179 | 11/1983 | Matsuoka et al. | 250/232 |
| 4,674,834 | 6/1987 | Margolin | 385/116 X |
| 4,737,215 | 4/1988 | Stoffels et al. | 156/166 |
| 4,743,089 | 5/1988 | Sakakibara et al. | 358/484 |
| 4,760,421 | 7/1988 | Margolin | 355/1 |
| 5,121,459 | 6/1992 | Chiang | 385/120 |
| 5,184,253 | 2/1993 | Hwang | 385/116 X |
| 5,208,699 | 5/1993 | Rockwell et al. | 385/116 X |
| 5,222,180 | 6/1993 | Kuder et al. | 385/115 |
| 5,245,686 | 9/1993 | Faris et al. | 385/120 |
| 5,258,858 | 11/1993 | Chow | 358/484 |

OTHER PUBLICATIONS

*EDS: The Electronic System Design Magazine,* –Dec. 1987 "What's New—An Electronic Imaging '87 Review", pp. 17–21.
*EDS: The Electronic System Design Magazine,*–May 1988 "What Was What At EI West," pp. 26–32.
*EDS: The Electronic System Design Magazine,*–May, 1988 "Processing Pictures in HSI Space".
*Electronic Design,* Dec. 1988, p. 73.
*BYTE Publications, Inc.,* Oct., 1983, pp. 67–86, Ciarcia, S. A. "Build the Micro D–Cam Solid-State Video Camera".

*Primary Examiner*—Brian Healy
*Attorney, Agent, or Firm*—Willian Brinks Hofer Gilson & Lione

[57] ABSTRACT

A method of making an optical scanner is disclosed that includes light transmitting and receiving optical fibers to illuminate and scan an image to be copied, transmitted or stored.

6 Claims, 13 Drawing Sheets

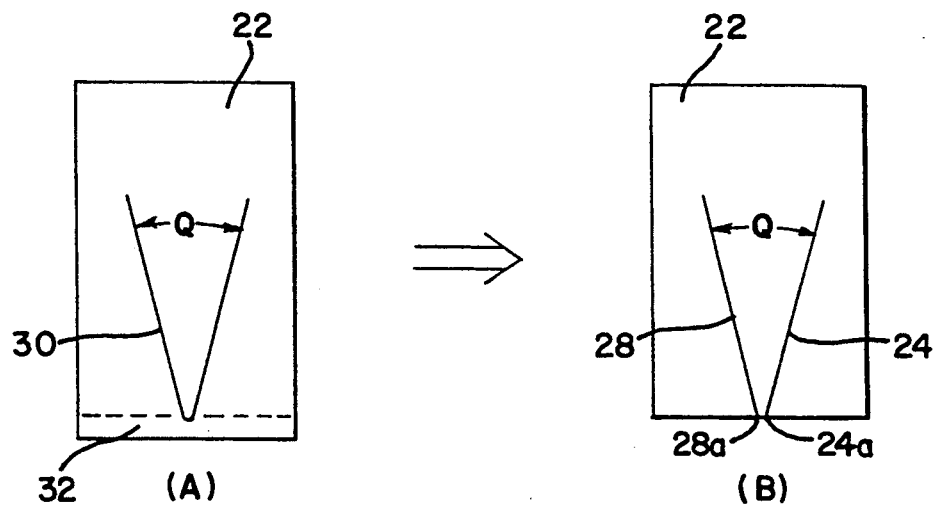
FIG_3_
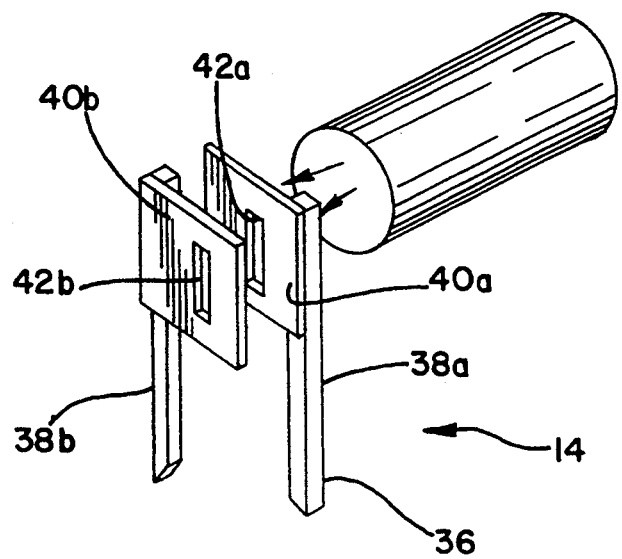
FIG_4_

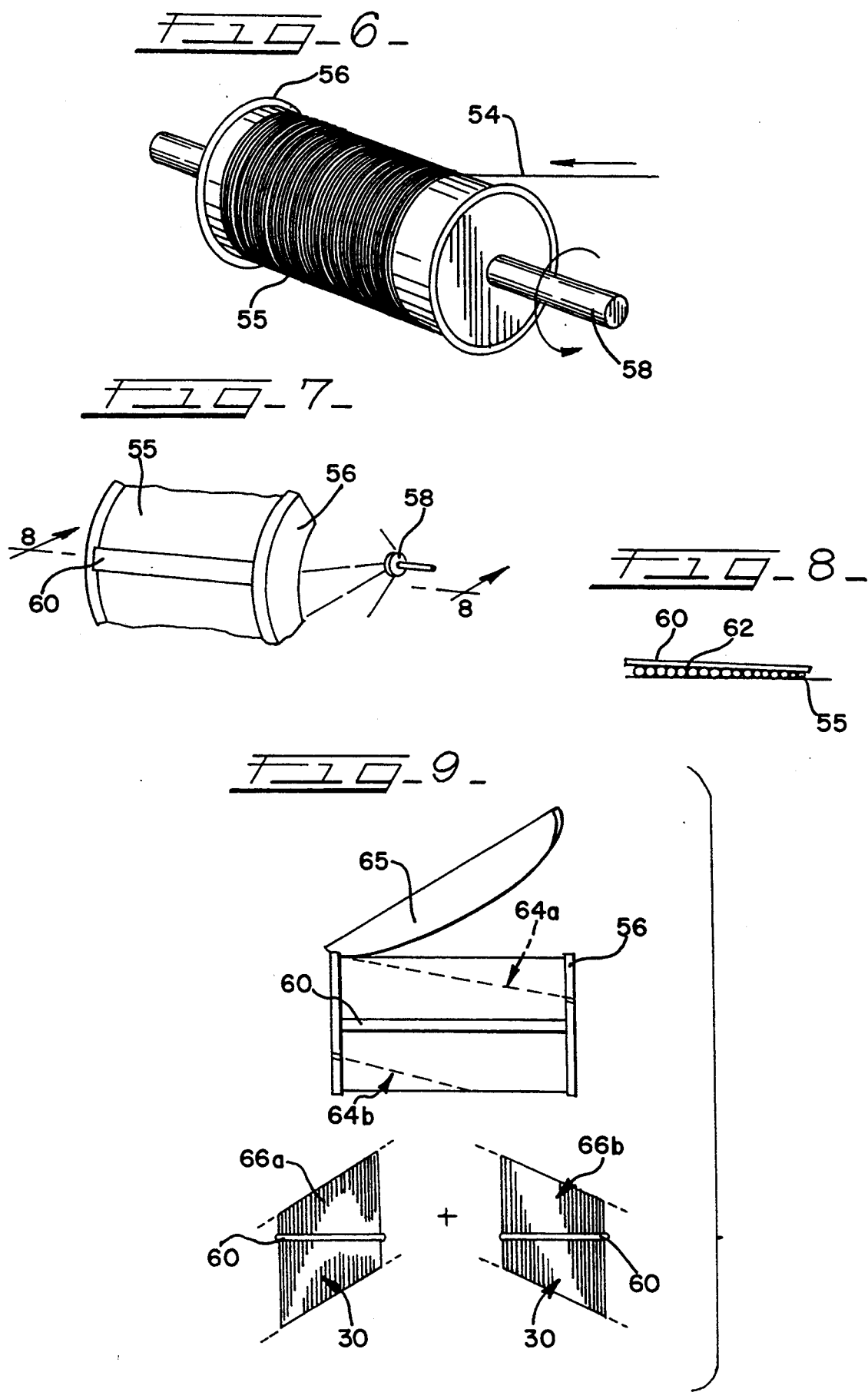

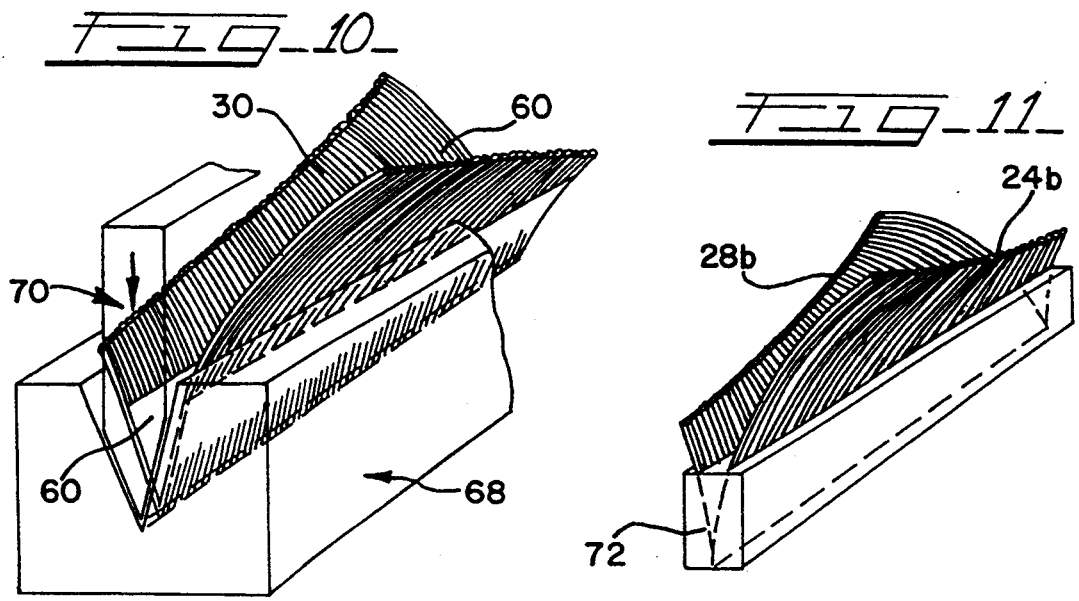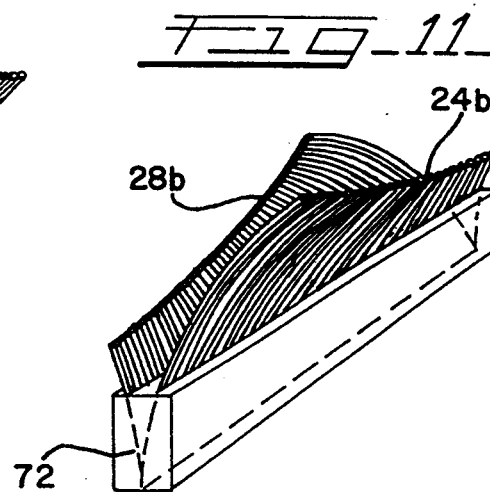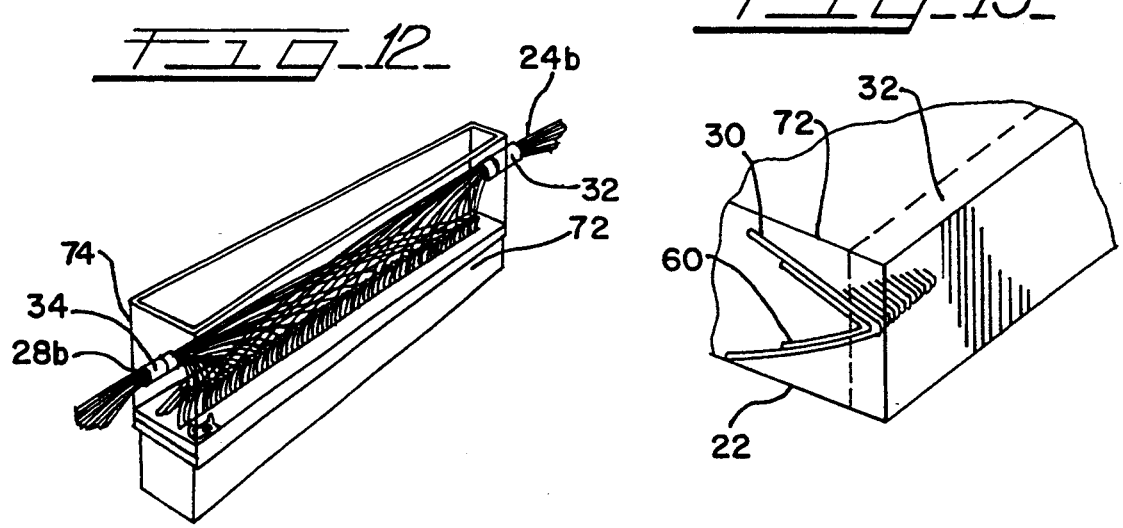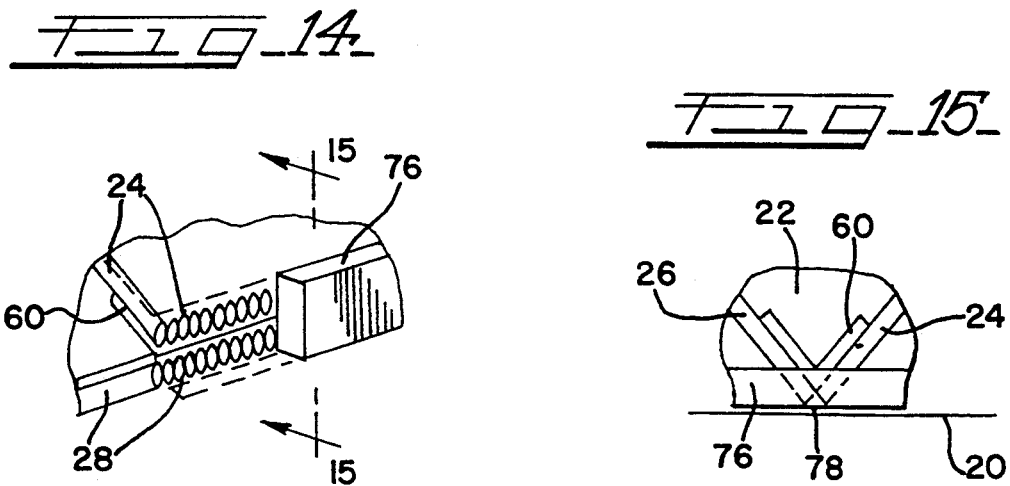

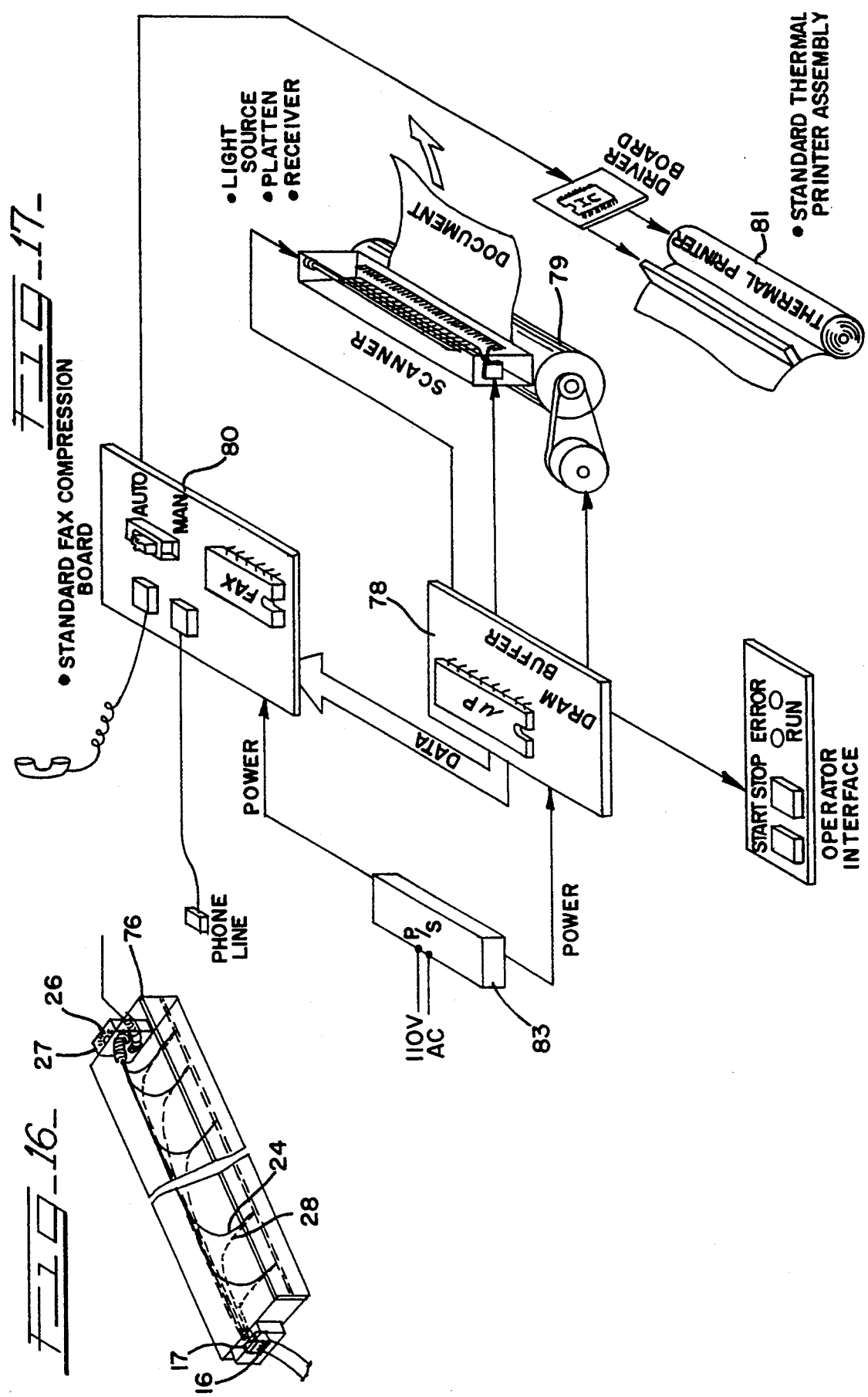

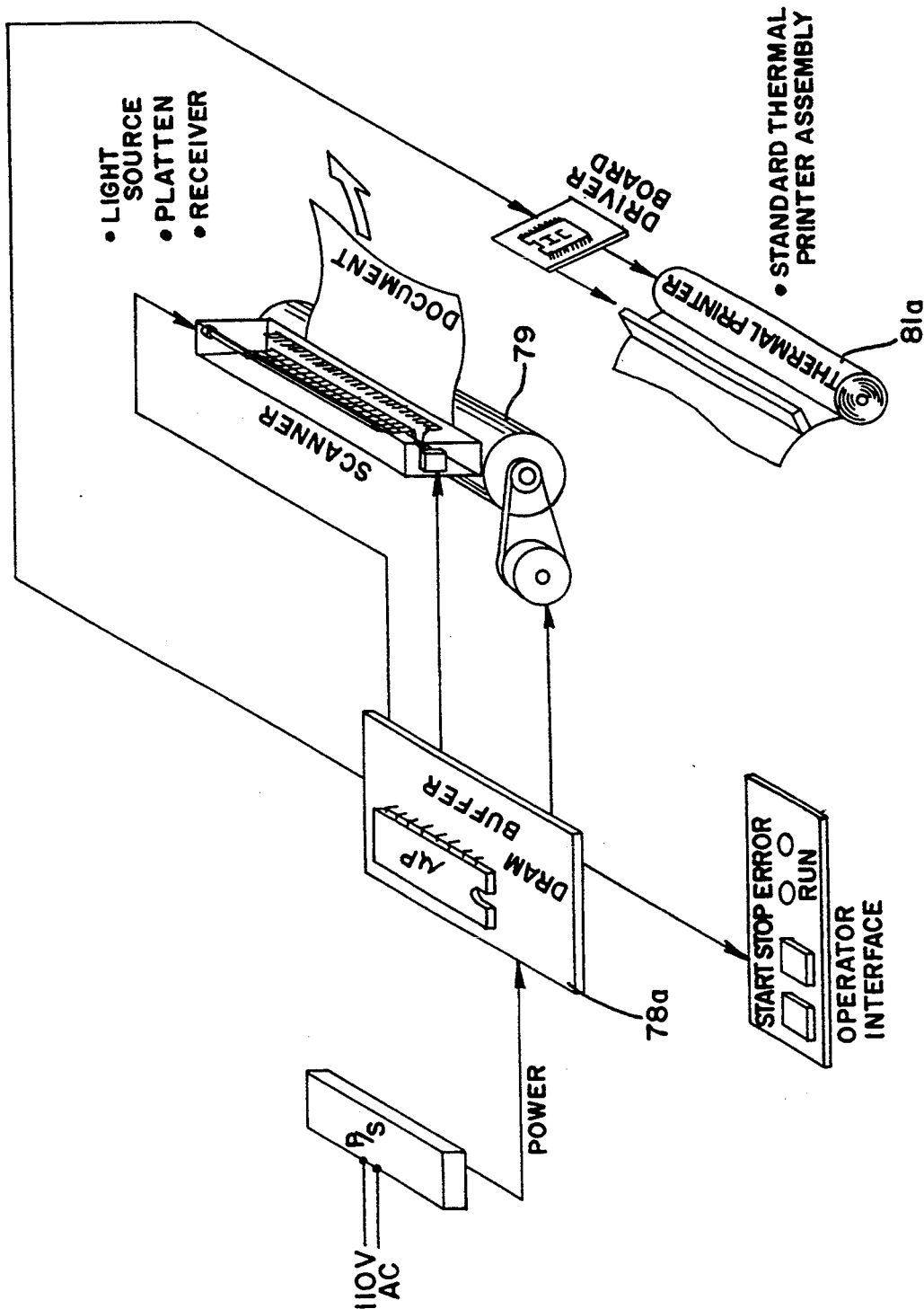

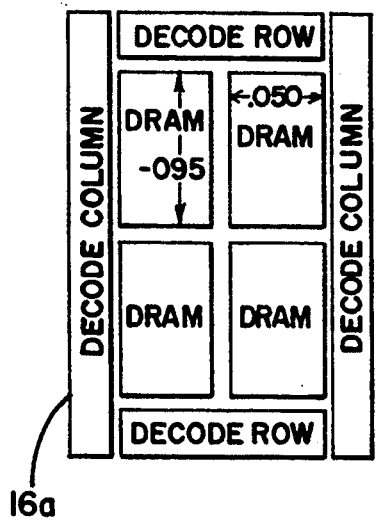
FIG_19_
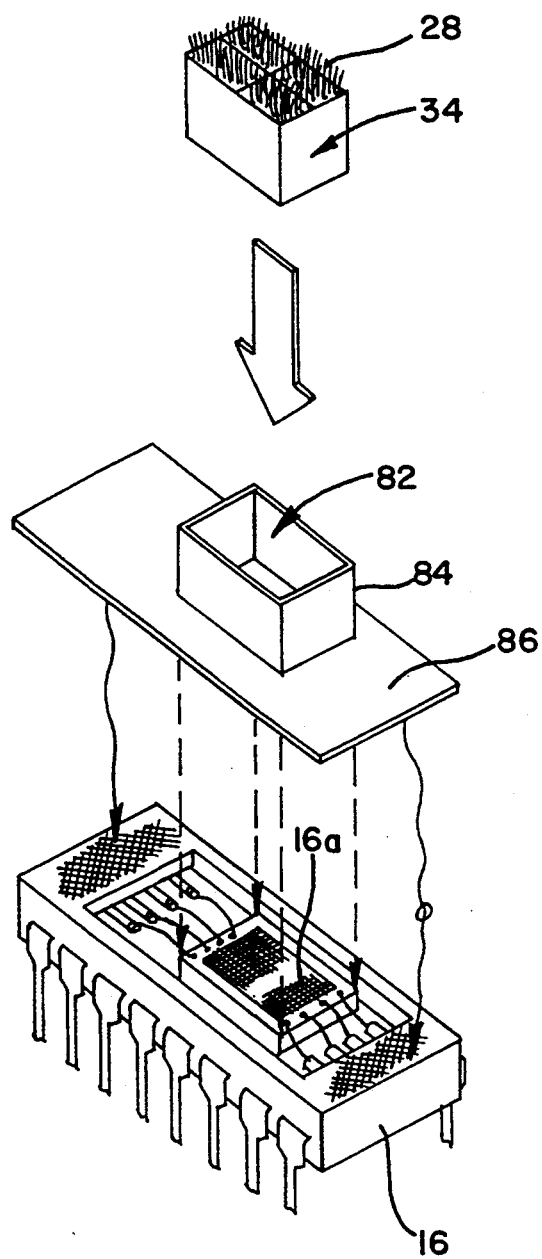
FIG_20_

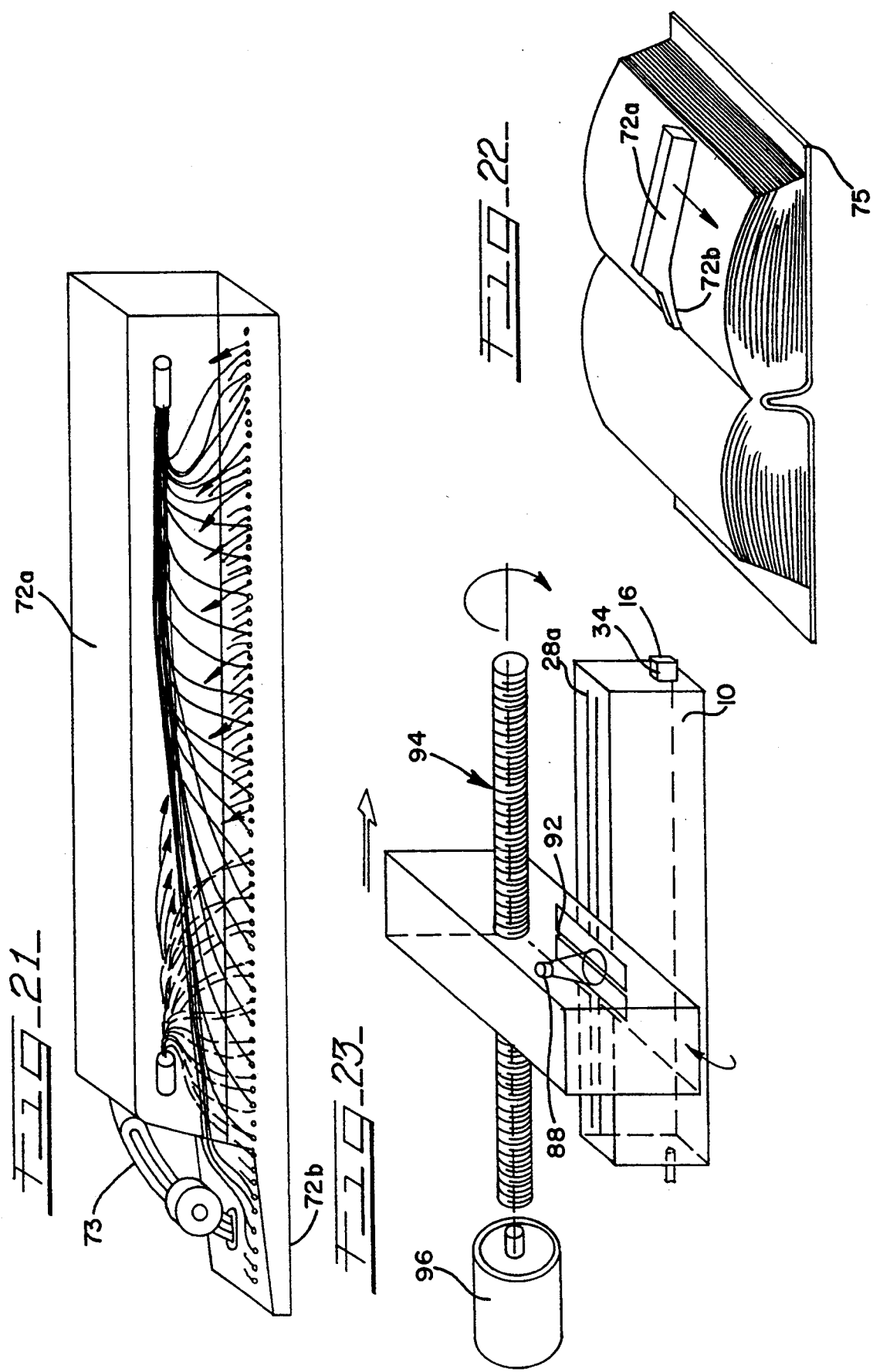

FIG_24.
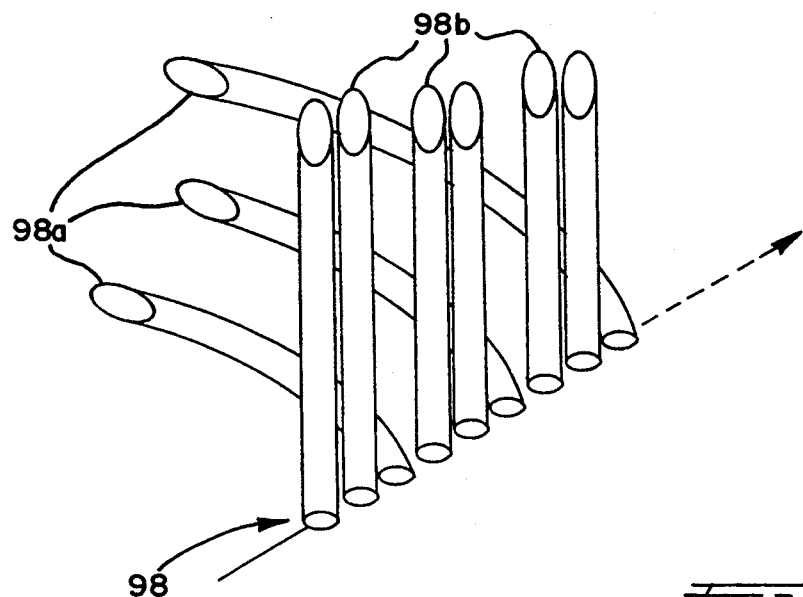
FIG_25.
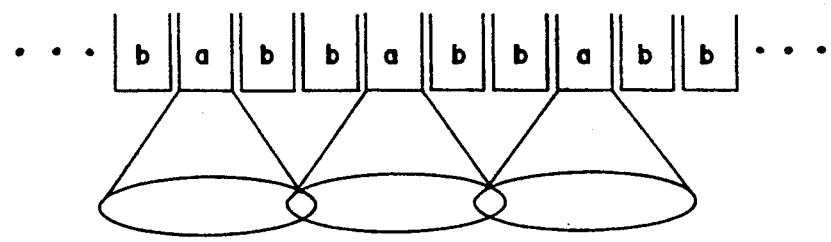
FIG_26.
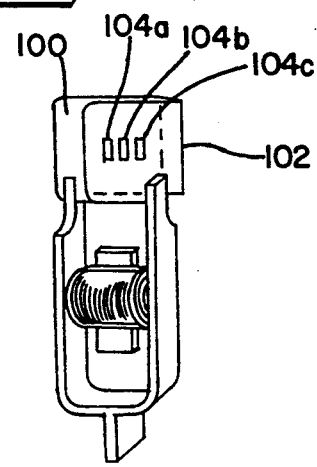

FIG_27_
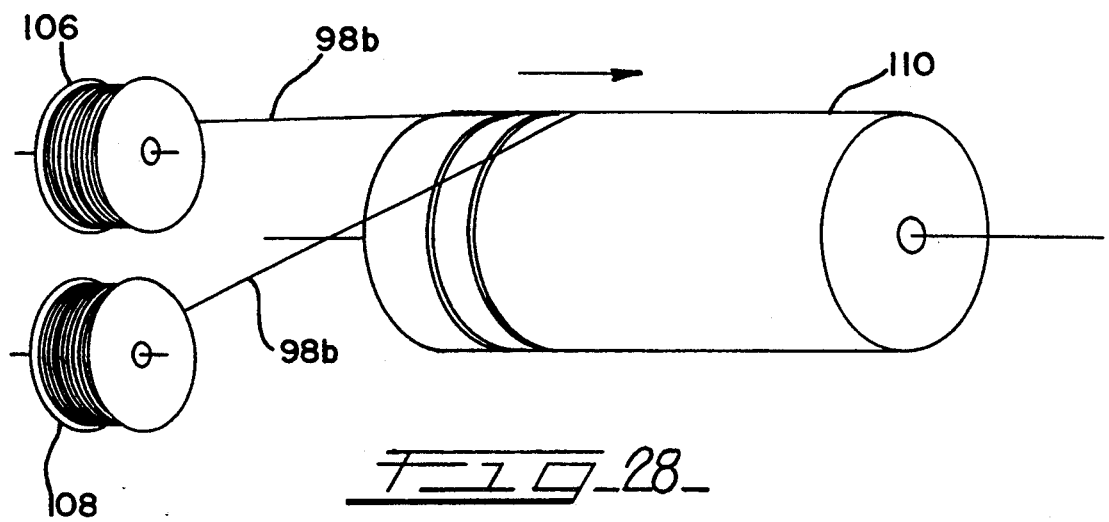
FIG_28_
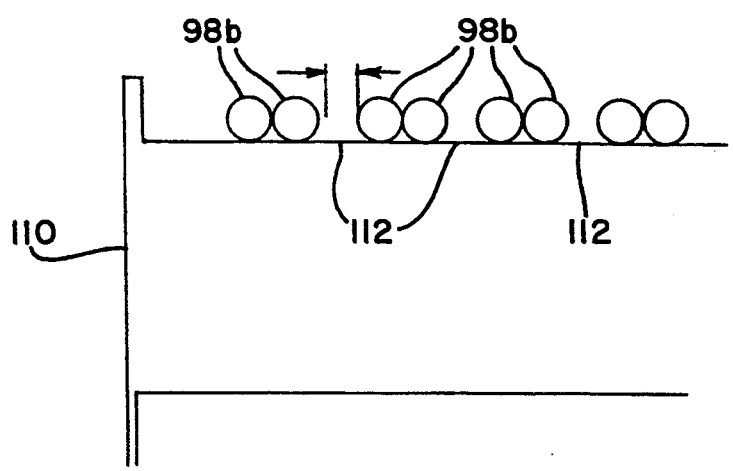
FIG_29_
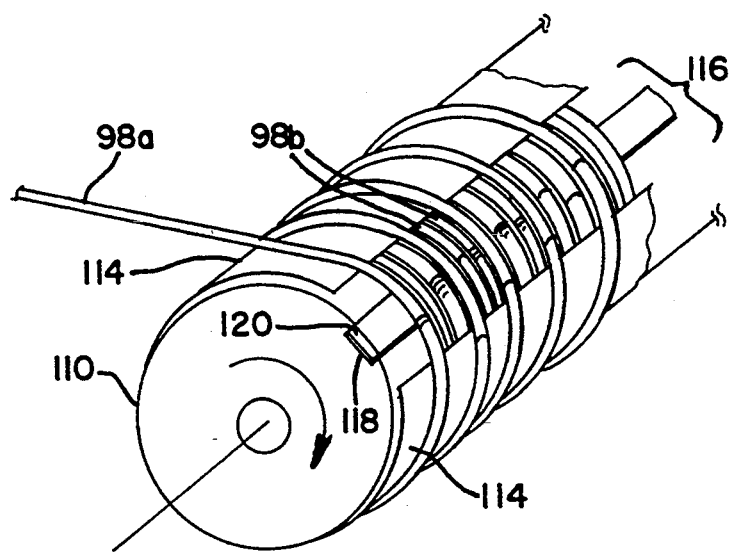

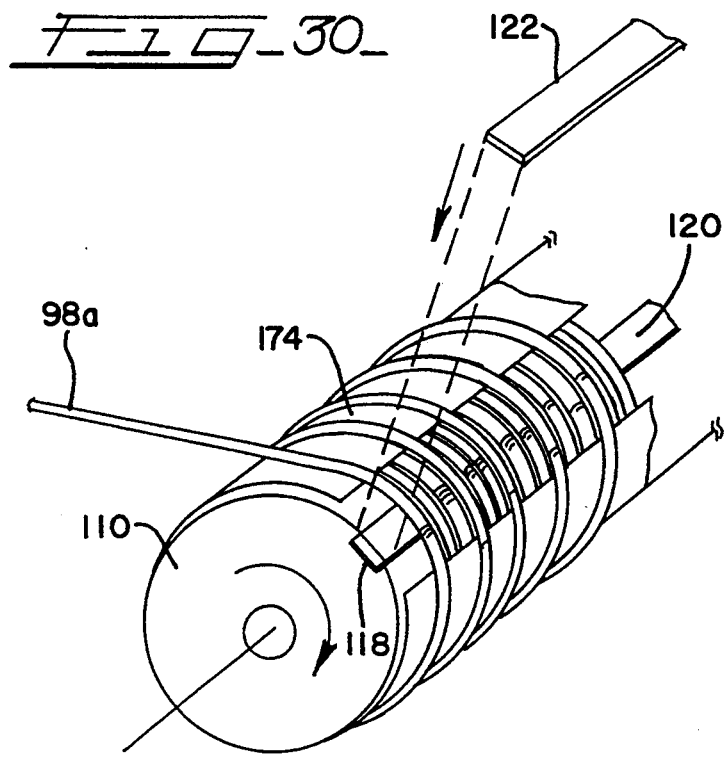
FIG_30_
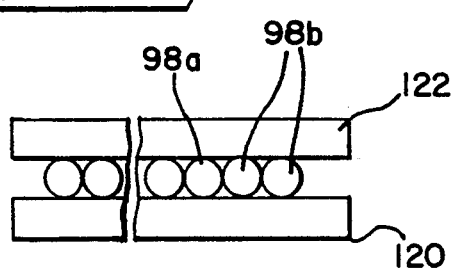
FIG_31_
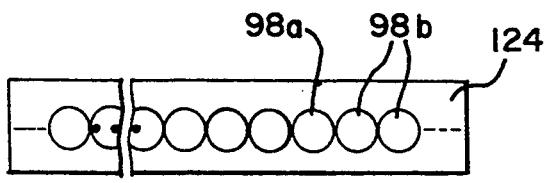
FIG_32_

METHOD OF MAKING A MODULATED FIBER OPTIC IMAGE SCANNER

This application is a divisional of U.S. patent application Ser. No. 07/517,109, filed Apr. 30, 1990, now U.S. Pat. No. 5,258,858.

BACKGROUND OF THE INVENTION

This invention relates to image scanners for use in facsimile machines and the like. Document scanning devices transform images on paper (text or art) into a digital format suitable for processing by a computer. This data base can then be used for a host of applications ranging from facsimile (FAX) machines to copying machines.

Current scanning devices rely on optical lansing to focus the image on paper onto the image plane of a "camera tube". Modern "camera tubes" are actually solid state charge coupled devices (CCD) or photo-junction sensors that convert the image into a digital signal.

In scanning the paper image, two approaches have been taken: area array scanning and line scanning. In area array scanning, "snap shot" composite pictures are actually of the document as it passes the viewing window of the scanning optical lansing (similar to composite aerial photography). An "area" CCD device (with other electronic circuits) then digitizes each "snap shot" and electronically "glues" these images back together inside computer memory. Once this electronic photograph is created, it can be used for any application where digitized image scanning is required (facsimile FAX machines, solid state paper copiers, computer document scanner, inspection machines, etc.).

The drawback for area scanners is in their limited resolution and cost. State-of-the-art resolution for an area CCD ranges from 128×128 lines square to 2000×2000 lines square. For use on an 8½ inches-wide documents, this represents a horizontal resolution of from 14 to 200 lines per inch. As a reference point, 200 lines per inch is still very coarse resolution for photographs, while newspaper quality pica type requires at least 70 lines per inch for proper font reproduction.

Area black and white (B/W) CCD pick-up devices are expensive and increase greatly in cost as the resolution and span coverage increase (above 8½ inch scan width). As an example, a zero defect 128×128 high speed area array can cost over one thousand dollars. Other arrays with higher resolution can exceed $10,000 just for the imaging CCD! (e.g. the Kodak 4-Mpixel imager; *Electronic Engineering Times*, Dec. 12, 1988. p. 14) The high cost of CCD's forces many imaging applications to use hybrid solutions where mechanical scanning is combined with CCD technology. A fast full feature FAX machine with no pixel defects and capable of 200 lines per inch resolution can sell for over two thousand dollars. Even the least expensive B/W FAX machine (with slow mechanically scanned CCD carriages) will still cost over $600.00. Low cost ($300 or less), high resolution scanners simply do not exist today.

In line scanning, linear photodiode or CCD arrays scan one line at a time as the document passes the sensor strip. This technique also requires optical lansing and supporting optical hardware. Sensor strip scanner integrated circuits are also very expensive; for example a zero defect 1024×1 linear array can cost over one thousand dollars (e.g. the Reticein RL1024C).

Black and white grey shade scanners are still premium devices available only to high level industry. In general, these scanners are very expensive and run just behind color scanners in high cost.

Color scanning devices are now afforded only by industry and run over $15,000. They use very expensive in-line strip CCD sensors, plus the document must be scanned three times (one for each primary color) for color encoding. A severe problem with such machines is maintaining exact alignment of the three scans so that color bleeding and loss of resolution does not occur.

Conventional optical scanners have many parts. This adds to product cost and therefore, selling price. This is one reason why low-cost scanners are currently not available. The following items highlight the major cost variables for a modern day image scanner:

a. Optics. Major cost items include a camera pickup device with scanning electronics, optical lenses, focus system, and strip aperture system.

b. Drive System. The mechanical drive system must be highly precise and requires stepper motors coupled to precision gears. Electronics to drive the stepper and precision parts are costly.

c. Illumination. A bright and flat source of illumination is required. This source must span a minimum of 9 inches and typically uses a gas discharge tube bulb powered by a high voltage power supply. In addition, green light filtering is necessary since CCD imaging devices must use this color to achieve maximum resolution.

Large document scanners for "D" size prints or drawings are not known to exist since it is quite costly to produce a 36 inch scanner (suitable for E size industrial prints). that offers 200 lines per inch resolution.

SUMMARY OF THE INVENTION

The current invention is an optical image scanner that includes a light source, a support, and a first array of optical fibers. First ends of the first fibers are disposed in the support; the second ends of the first fibers are disposed to receive light emitted from the light source. First ends of a second array of fibers are disposed in the support adjacent the first ends of said first fibers. The second ends of the first fibers are disposed in light-transmitting relationship to the array of light-sensitive elements. As an image is moved relative to said support, light from the light source transmitted from said first ends of said first fibers will reflect from the image, and the reflected light is received by the first ends of the second fibers and detected by the array of light-sensitive elements. The information received by the light-sensitive elements is electronically sorted to reproduce said image.

For reasons set forth below the present invention is an inexpensive, high-resolution optical scanner that can be constructed for B/W, grey scale, or color reproduction. In addition, the optical scanner of this invention can be constructed to scan documents exceeding 8.5 inches in width, in fact documents up to E size industrial prints can be scanned. The optical scanner of this invention, therefore, can be used to transmit or copy documents of a size and at a cost not possible before.

BRIEF DESCRIPTION OF THE DRAWINGS

FIGS. 3a and b is an illustration of the method of manufacturing an optical scanning element used in the present invention;

FIG. 4 is a detailed exploded perspective view of a tuning fork chopper assembly used in the present invention;

FIG. 6 is a perspective view of a drum that is used in the manufacture of an optical scanning element of the present invention;

FIG. 7 is a detailed perspective view of a drum of FIG. 6 onto which optical fibers have been wound and adhered together;

FIG. 8 is a cross-section through the wound fibers of FIG. 7 taken along the plane of line XIII—XIII of FIG. 7;

FIG. 9 is an illustration of how fiber bundles are cut from the drum of FIGS. 6 and 7;

FIG. 10 is a detailed perspective view of a die assembly used to make an optical scanning element of the present invention;

FIG. 11 is a perspective view of a partially assembled optical scanning element of the present invention;

FIG. 12 is a perspective view of the partially assembled element of FIG. 11 in a further step of manufacture;

FIG. 13 is a detailed perspective view of the optical scanning element during a step in manufacture;

FIG. 14 is a detailed perspective view of the optical scanning element during a step in manufacture;

FIG. 15 is a cross-section taken along the plane of line XV—XV of FIG. 14;

FIG. 16 is a perspective view of an assembled optical scanning element of the current invention;

FIG. 17 is a schematic representation of the scanner of the present invention used in a facsimile machine;

FIG. 18 is a schematic representation of the scanner of the present invention used in a photocopy machine;

FIG. 19 is a plan view of the active surface of a dynamic RAM device used to receive light from the refelctance fibers in the optical scanning element of this invention;

FIG. 20 is an exploded perspective view of the assembly of the reflectance fibers and the dynamic RAM device of FIG. 19;

FIG. 21 is a perspective view of a flexible scanning element of the present invention;

FIG. 22 is a perspective view of the flexible scanning element of the present invention used in scanning a non-planar surface;

FIG. 23 is a perspective view of a fiber decoder/unscrambler used to calibrate a scanning element of this invention;

FIG. 24 is an illustration of an alternative embodiment of the optical scanning element of this invention;

FIG. 25 is an illustration of the arrangement of transmitting and receiving fibers in the optical scanning element of FIG. 24;

FIG. 26 is a detailed exploded perspective view of a tuning fork chopper assembly used in the color scanner of the present invention; and FIGS. 27-34 illustrate a method of manufacturing the optical scanning element of FIG. 24.

DETAILED DESCRIPTION OF THE PREFERRED EMBODIMENT

Figure 1:
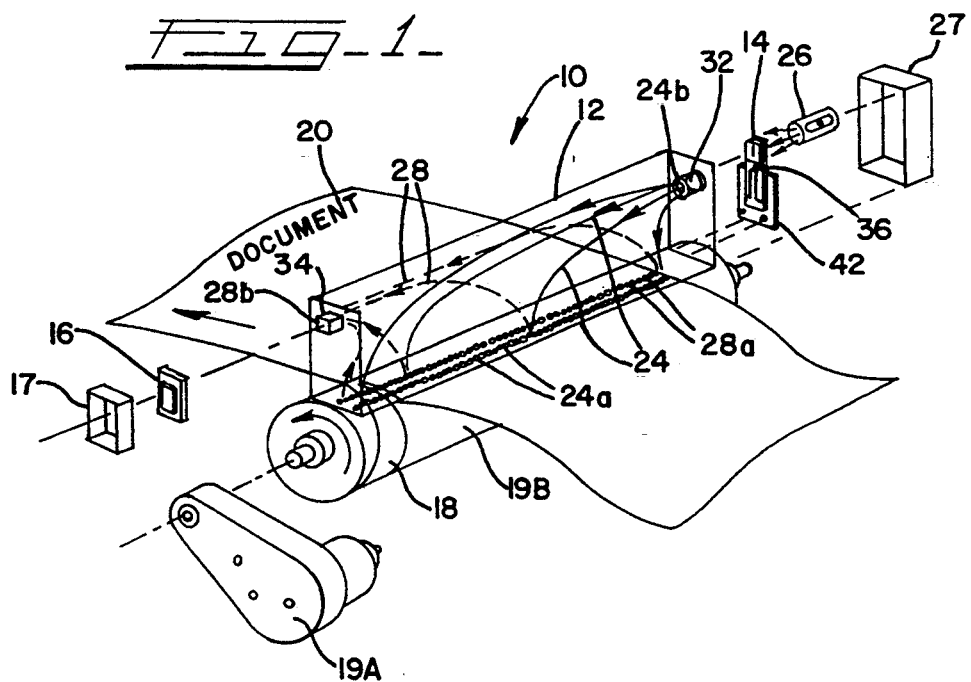
FIG. 1 is a perspective, exploded view of an optical image scanner of the present invention.

The optical scanner 10 (FIG. 1) of the present invention includes an optical scanning element 12, an optical chopper 14, a light-sensitive array 16, and means 19A, 19B (such as a motorized roller) for moving an image 20 relative to optical scanning element 12.

Optical scanning element 12 comprises a support 22 that in the preferred embodiment is a body of polymeric material in which two parallel linear arrays of optical fibers are embedded. The first array of optical fibers 24 has its first ends 24a embedded in the support, and the second ends 24b of optical fibers 24 are disposed to receive light from light source 26. The second array of optical fibers 28 has its first ends 28a embedded in support 22 in a line parallel to the first ends 24a of first array 24. The second ends 28b of second array 28 are disposed in light-transmitting relationship with light-sensitive array 16.

The importance of embedding the optical fibers in a moldable material cannot be overstated since allowing flexing or movement of the fibers during or between uses of the device can lead to changes in the optical transmitting characteristics of the fibers which can produce variations in scanning quality. It is also important to use moldable materials that do not transmit light to minimize the chance of light transmission between adjacent or proximate fibers, particularly at the scanning ends of the fibers.

As shown in FIGS. 3A and 3B, the first array of transmitting optical fibers 24 and the second array of receiving optical fibers 28 are molded in a rectangular support or ferrule 22 that is formed from a polymeric material (e.g. Biwax 646 epoxy from Biwax Corporation, DesPlaines, Ill.) that is molded around the fibers that are positioned in a rectangular mold. In fact, each transmitting-receiving fiber pair is formed from a single fiber as shown in FIG. 3A. The single fiber 30 is supported in a V-shape configuration as shown in FIG. 3A, and the ferrule is molded around the fiber. The bottom portion 32 (represented by the dashed line in FIG. 3A) is then removed by machining it away to separate the single fiber 30 into two fibers 24 and 28 having ends 24a and 28a in close proximity (e.g. from about 0.02 to about 0.07 mm) to each other. The portions of the fibers 24 and 28 near ends 24a and 28a also are positioned to form an acute angle "Q" (FIGS. 3 A and B) between about 5 to about 15 degrees, preferably from 8 to about 12 degrees. Further details of the assembly of an optical scanning element of the current invention are provided below.

Figure 2:
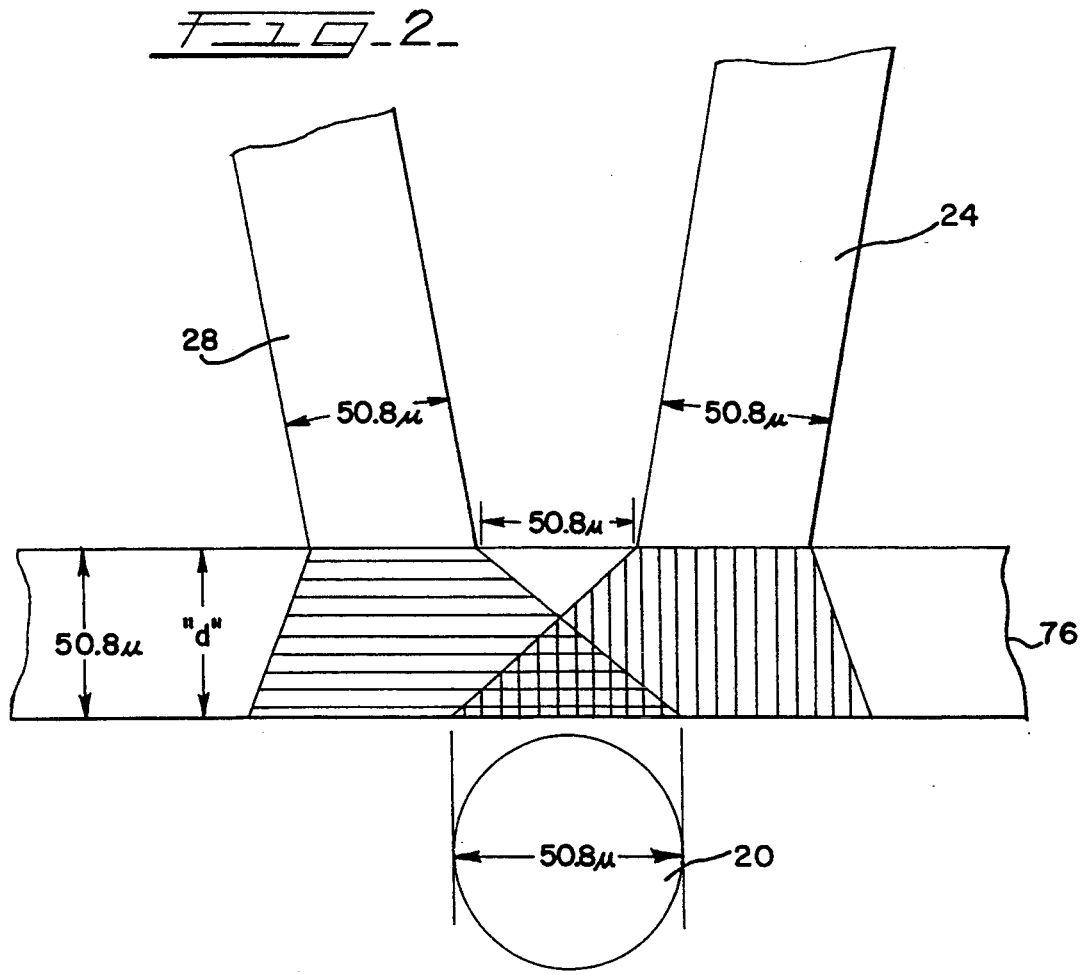
FIG. 2 is a detailed view of the operation of the fiber optics in the present invention.

During scanning, array 24 acts as a linear light source, i.e. linear along the longitudinal axis of scanner element 12. Array 28 acts as a linear reflectance pickup to receive reflected light from the surface of the paper. This is illustrated in FIG. 2. As the document is scanned, the two arrays 24, 28 are just above the surface of the image 20. In fact, the proximity is important to high resolution. It is recommended that the ends 24a and 28a be a controlled distance "d" (FIG. 2) from 0.05 to 0.10 mm from the paper image 20. Preferably, the distance "d" should be from about 0.05 to 0.06 mm, most preferably, 50.8 microns (0.002 inch) (the diameter of the preferred fibers). This distance is preferably controlled by placing a transparent film 76 (FIG. 2) of the appropriate thickness over the ends 24a and 28a. However, the distance can be maintained even over an air gap with precision paper feeding devices.

It can be seen from FIG. 2 that each fiber 24 will illuminate the area illustrated by the vertical crosshatching, while the area "scanned" by the receiving fiber 28 is illustrated by the horizontal crosshatching. Where the crosshatched areas meet is the region where the image is scanned. With the fiber diameters in FIG. 2 and the spacing between the fibers of 50.8 microns, the device can scan an image 20 as small as 50.8 microns.

As indicated above, ends 24b of fibers 24 are positioned to receive light from light source 26. The ends 24b are collected in a round collett 32 that is later molded into support 22. The order that these fibers are captured in collett 32 is unimportant. Once the ends 24b are collected and molded into support 22, they are cut and polished.

Ends 28b are, of course, positioned to transmit light to light-sensitive array 16. Ends 28b are collected in a rectangular collett 34 that is later molded into support 22. The order that these fibers are captured in collett 34 is also unimportant as will be explained in detail below. Once the ends are collected, they are cut and polished.

Optical chopper 14 is positioned between light source 26 and ends 24b of fibers 24. Optical chopper 14 is not necessary for straight B/W scanning. However, for grey scale and color scanning, the optical chopper is needed. Chopper 14 is a tuning fork 36 (FIGS. 1 and 4), the tines 38a and 38b of which have welded to their respective ends flat Stainless steel apertured blades 40a and 40b, respectively. The apertures 42a and 42b are normally in alignment when the tuning fork is not oscillating. The two tines (and hence the apertures) will oscillate once inward and once outward during each cycle. When the apertures are fully inward toward each other, they are substantially out of alignment so as to prevent light from passing through the apertures from the light source to the ends 24b of fibers 24. Likewise, when the apertures are fully outward away from each other, they are substantially out of alignment so as to prevent light from passing through the apertures from the light source to the ends 24b of fibers 24. However, as the apertures move toward each other from their outermost positions, they first partially align, progressively allowing more light to pass, until they are in complete alignment when they allow the maximum amount of light to pass. As the apertures move further inward, they are still partially aligned, progressively allowing less light to pass until they reach the point where they are misaligned and will no longer allow light to pass. Thus, this motion will generate two maxima and two minima of light per cycle. Using angular degrees as a reference, the minima occur at 0 and 180 degrees while the maxima occur at 90 and 270 degrees. Zero degree is defined as the extreme outward motion of the apertures.

The use of a chopper is an important element in this fiber scanner invention. As the light source is increasing and decreasing in a near-linear fashion (due to the rectangular apertures), the document being scanned will be illuminated in the same way. Since the linear reflectance fibers are looking at the same line that the source fibers are illuminating (for reasons explained below), the reflected image will always be black at dark angles of 0 and 180 degrees (no illumination) and will have maximum reflected light at 90 and 270 degrees. This modulation makes multilevel grey scale scanning possible.

A pixel is defined as the smallest dot size that can be resolved. By design, when the rectangular apertures are fully open, even dark levels of grey will be illuminated brightly enough to be sensed by the scanner. If it is not sensed, the pixel being scanned must be pure black. All shades of grey from near black to pure white will be sensed somewhere along the chopper illumination ramp. The closer a shade is sensed to 0 or 180 degrees (dark angles), the more reflective or bright is that pixel. On the other hand, the closer a shade is sensed to 90 or 270 degrees (bright angles), the less reflective or dark is that pixel.

The tuning fork is placed over a permanent magnet assembly 42 (FIG. 5) that has an electromagnetic coil 44 wound around it. When the coil is excited by an electrical square wave signal (at resonant frequency) of sufficient amplitude, the fork will be forced into constructive oscillation.

The fork vibration will slowly build up amplitude and stabilize (within 5 seconds) when the oscillation inertia equals the flexible resistance. Once stabilized, the magnetic coil will push and pull on the fork and keep it excited. In this state, the chopper oscillates at its natural frequency and will undergo an exact displacement. These two characteristics makes a chopper perfect for precision light modulation.

The ends 28b of fibers 28 are butted flush to light-sensitive array 16. Light-sensitive array 16 is a dynamic RAM memory device, and it is secured to the fibers with clear epoxy. Array 16 can also be a CCD, a photodiode array and the like.

It is unimportant how the fiber orients itself to the active surface of the dynamic RAM. Once secured, the orientation of the fibers to the RAM surface can never change.

As shown in FIG. 23, the position of each fiber on the active surface of the dynamic RAM is initially determined after manufacture of the optical scanning element by passing a light source 88 housed in a housing 90 that has a 0.0005" slit 92 in it over the ends 28a of receiving fibers 28 so that ends 28a re-receive the light emitted through the slit. As the end of each fiber 28 is illuminated, its position on the dymanic RAM is recorded in memory, and a specific cell address is determined for a particular element on the RAM for that fiber. The specific element selected is typically in the center of the illumination field of the fiber on the RAM chip. Thus, the images scanned when the product is used can be unscrambled by the computer memory. As shown in FIG. 23, housing 90 is driven by a lead screw 94 in turn driven by a motor 96.

The dynamic RAM used is a low cost memory integrated circuit that is sensitive to the visible light spectrum. Since the optical fibers are directly touching the surface of the IC die, problems such as optical image scattering, depth of field concerns, image blooming, and image pixel overlap are either minimized or completely eliminated.

Converting reflectance light information into a digital form without the use of glass optics will keep distortion to a minimum. Many existing scanners can only realize 70% of their calculated resolution due to the distortion problems mentioned above.

In a low cost dynamic RAM with 256×256 lines of resolution, a total of 65,536 points will be available in the RAM memory array. Since the optical fiber bundle has a total 4,500 fibers for a 9 inch scan width with 500 dots per inch resolution, it is only necessary to use 4,500 sensor elements and ignore the rest. The size of each RAM element is much smaller than the 0.002 inch diameter fibers. This allows the cross section of each 0.002 inch fiber to overlap many cell elements on the RAM die. Because the fiber is flush against the die surface, light coupling between the fiber and the immediate RAM cells is very efficient. Around 14 cell elements will be captivated by each fiber. Fewer than all and preferably one key RAM cell element in this group (close to the fiber center) will be selected as the primary sensor(s) for each unique fiber.

One advantage of using so small a number (relatively) of sensor elements is that signals from the remaining elements need not be processed. By reading and processing only signals from only selected elements, the speed of the scanning can be maximized.

A dynamic RAM is an integrated circuit comprising many "memory cells". Each cell is basically a very small charge storage capacitor and an electrical switch (FET field effect transistor) that can connect this capacitor to a "sense line". This sense line has the ability to "sense" minute electrical charges that might be present in the storage capacitor of a memory cell. If the storage capacitor has no charge in it, it is defined as LOGIC 0. If a charge exists, the memory cell is defined as a LOGIC 1. However, depending on the RAM device, this logic can be reversed.

Since the "charge" in a memory cell cannot be permanently retained by the storage capacitor (due to inherent semiconductor leakages), a LOGIC 1 state will "leak away" and be lost unless the capacitor is routinely recharged or "refreshed". This refresh process senses the charge in a memory cell and rewrites a fresh charge back into it. Conversely, if a memory cell has no charge in it, the refresh action will make sure that this cell is kept in a discharged state. For this reason, this device was named "dynamic RAM".

To address a particular memory cell in the dynamic RAM, a row address and a column address must be defined. This function is usually performed by external electronic circuits supporting the RAM. Based on this address code, decoder circuits internal to the RAM will either read the state of that memory cell (LOGIC 1 or 0) or write a state into that memory cell.

By nature of the dynamic RAM design, if a memory cell is read, it is automatically also refreshed. In addition, if any memory cell in a particular row is read, every other memory cell in that same row is also refreshed. A refresh for all rows must be performed every few milliseconds or information will be lost. It is important to note that if a memory cell is only 60% charged (40% discharged), a refresh cycle will immediately bring this charge back up to 100%.

If a dynamic RAM memory cell is "armed" by putting a LOGIC 1 into it (charged capacitor), this cell will normally retain this information for at least 1 to 4 milliseconds. This is true only if the cell is not exposed to light. If light is falling on this memory cell, the energy from the light will create leakage paths (proportional to the light intensity) which accelerates the discharge of the memory capacitor.

The more intense the light, the faster the charge will decay in the memory cell. This decay can be as short as 10 microseconds. By comparison, one read cycle into the dynamic RAM is much shorter and takes a maximum of 90 nanoseconds. The importance of this ratio will soon become clear. For definition, a microsecond is 1 millionth of a second while a nanosecond is 1 billionth of a second.

SCANNER PRODUCT FAMILY BASED ON THIS INVENTION

Product 1 (16-Grey Level B/W Scanner)

Scan sequence description:

a. Before scan line execution, the optical RAM is quickly loaded with all LOGIC 1's. This is done at aperture angels of 0 and 180 degrees.

b. A frame is defined as a window segment in the aperture motion where a read process is done on the dynamic RAM. Sixteen such reads will be performed for each full chopper cycle. A read is done only on the positive slope portion of the chopper waveform. As mention before, there are two rising light ramps in each chopper cycle (0–90 degrees and 180–270 degrees).

c. During the first increasing ramp of light (0–90 degrees), eight frame reads will be taken. In the second ramp (180–270 degrees), another eight frame reads will be done. In total, 16 frame reads for 16 levels of grey will be executed every chopper cycle.

d. By definition of design, the first group of 8 frame reads will do a line scan for odd grey levels (1,3,5,7,9,11,13,15) while the second 8 frame reads takes care of the even grey levels (2,4,6,8,10, 12,14,16).

e. During a frame read period, three actions will take place. The first two events are intertwined (memory cell read and refresh) while the third event exposes the memory cell to light.

f. For 500 dots per inch horizontal resolution, one 9" scan line requires 4,500 fibers. At 90 nanoseconds per fiber, it will take 405 microseconds (4,500×90 ns) to do one full line scan. Since refresh is inherent to the read process, all memory cells are repeatedly refreshed during this 405 microseconds period.

g. The dynamic RAM used (e.g. a Motorola MCM 6665B or a Micron Technology MT4264) as the optical sensor has a 64K×1 structure (65,536 cells). Access to memory cells are through 256 row addresses and 256 column addresses. By entering a specific row and column address, one specific memory cell out of 65,536 can be read or written into. This allows the designated cell under each fiber to be accessed at random.

h. The reflectance fibers are bundled into a rectangular shape with polished ends which fits directly on the top of the dynamic RAM die and affixed in place by clear epoxy. A hermetic MT4264 ceramic package is used but with the top metal lid removed. This is illustrated in FIGS. 19 and 20. FIG. 19 shows the configuration of the active surface 16a of a dynamic RAM—the Motorola MCM6665B. The surface is divided into four DRAM areas, each of which is about 0.095×0.050 mm in size. Thus, there is roughly 0.0180 mm2 of surface area total among the four areas. Accordingly, this area can accomodate approximately 4,750 fibers (each of which is 0.002 mm in diameter).

As shown in FIG. 20, the receiving fibers are gathered into a rectangular collett 34 that is divided into quadrants corresponding in area to the four DRAM areas on active surface 16a. The collett is then positioned in an alignment guide 82 that has a rectangular sleeve 84 adapted to receive collett 34, and a flange portion 86 adapted to overlay and align with the array 16. The assembly is secured by applying clear epoxy to the active surface 16a and the polished ends of receiving fibers 28, and positioning them so that the fibers are in close proximity to the active surface.

i. The dynamic RAM die has a length to width aspect ratio of 5 to 1 that will easily support 4,500 fibers in an array of 30 fibers (columns) by 150 fibers (rows). The MT4264 die dimensions are 2.176 mm × 11.008 mm. With 4,500 fibers at 0.002" diameter each covering the die, almost the full die will be encompassed. Each 0.002" diameter fiber will bear a "footprint" over 14 memory cells (65,536/4500) on the die. The inner most cell of each fiber footprint will be chosen as the key sensor for that single fiber.

j. During the read/refresh period, each memory cell will be refreshed at least 30 times (4,500 points/150 fiber rows=30 access) or 13.5 microseconds (405 usec/30=13.5 usec) between refresh events. As mentioned earlier, this high rate of refresh is a direct result of reads to other memory cells in the same row.

k. At the end of each read/refresh period, the optical RAM will be allowed to be exposed to light for 135 microseconds (13.5 usec × 10) before the next read/refresh event. This exposure time is 10 times longer than the refresh duration (13.5 usec) of a memory cell. To maintain good exposure control, it is important to keep refresh time no more than 10% of exposure time.

l. Exposure time for the RAM is exactly the same as exposure time for film in a camera. In the RAM, each exposure event is done with a "fresh" piece of film which gets loaded in the read/refresh cycle. Since there is no real mechanical "shutter", light is always impinging on the RAM at varying intensities. This scenario is like loading fresh sheet film into a camera in open light. For this to work, the loading time must be small compared to the overall exposure time. Now it becomes clear why the read/refresh period is kept to 10% of total exposure. If it is too long, the uncertainty in exposure will be of concern. A 10 to 1 ratio was selected to insure good linearity during grey scale encoding.

m. To achieve maximum grey scale linearity, frame reads are taken at strategic points on the chopper aperture cycle. From 0 to 180 degrees, reads are taken at 15, 23, 32, 41, 49, 58, 66 and 75 degrees. From 180 to 360 degrees, reads are taken at 203, 212, 221, 229, 238, 246, 255 and 270 degrees. A total of 16 frame reads are taken. No frame reads are taken during second and fourth aperture quadrants (91–180 degrees and 271–360 degrees). This time is unsuitable for grey scale scanning, because a refresh cycle is now mandatory before every read since the light intensity is decreasing, not increasing. For two level B/W scanning this is not a concern and scanning can be performed in every quadrant as discussed below.

n. For each document scan line, 16 read/refresh and exposure frames of data are processed (4,500 points × 16 frames=72,000 data points). Data reduction on a real time basis is necessary to avoid an overflow of imaging data. The final form will reduce the raw data into just one grey level for each of 4,500 pixel points. Preliminary data processing (during exposure time) are interweaved within read frame scans while final processing take place during quadrants 2 and 4. By buffering only one frame line of data at a time, this technique is very hardware-efficient and further reduces product cost.

o. In one frame scan, the optical RAM read/refresh sequence takes 405 microseconds and the exposure sequence takes 135 microseconds. By design, this total of 540 microseconds will equate to 8.5 degrees of aperture motion. Also by design, one complete aperture cycle will scan only one document line. Therefore, this process will take 22.87 milliseconds to scan one document line (360 degrees/8.5 × 540 usec).

p. The chopper aperture will be oscillating at this same period of 22.87 milliseconds. This equates to a frequency of 43.72 Hz. During scanning, the document is fed through the scanner by a simple drive mechanism, e.g. an asynchronous motor 19 (FIG. 1). This mechanism does not have to be synchronized to chopper motion because line number information is always an integral part of the imaging data read. The only restriction is that the document feed rate should not be faster than 22.87 msec. per line.

q. For 500 dots per inch (dpi), 300 lines per inch (lpi), and 16 levels of grey scanning, the scanner of this invention can scan a document at 6.86 seconds per inch (22.87 msec × 300). For an 8½" × 11" document, scan time will be 75 seconds. At this resolution level, this scan time is still much faster than anything available on the market today.

Product 2 (8-Grey Level B/W Scanner)

a. This scan sequence is basically the same as the 16-grey level B/W scanner. Each half cycle of aperture motion will still process 8 levels of grey but it will now be for ONE complete scan line (not half). By cutting the grey scale resolution by 50%, scan line speed doubles. Chopper frequency is still at 43.72 Hz.

b. For 500 dpi, 300 lpi and 8 level grey scale scanning, this product can scan an 8½" × 11" page in 37.5 seconds. With 8 levels of scaling, newspaper quality image scanning can still be achieved.

Product 3 (Variable Threshold B/W Scanner)

a. This sequence is basically the same as the 8-grey level B/W scanner. Chopper frequency is still at 43.72 Hz. Instead of processing 8 levels of grey in each half cycle, only 2 frame reads are processed. These two reads, however, are done differently. One read is taken when the light intensity is increasing while the next is taken when the light intensity is decreasing. These reads are all triggered by the same light threshold. The exact point is defined by an adjustment under user control. This "dial" is like the brightness control found on a photocopying machine. The higher the setting, the brighter the illumination will have to be before a line scan is triggered. With this adjustment, a black and white image can be scanned to emphasize light lines or it can be adjusted to de-emphasize very bright lines. This feature is extremely useful for opaque materials or poor originals which existing scanners can not accommodate.

b. Since the same level of illumination occurs four times per aperture cycle, four line scan reads can be done instead of two. To allow this to happen, the dynamic RAM memory must be rearmed to logic 1's before each read. In this way, line scans can be executed regardless whether the illumination is increasing or decreasing. When the scan is triggered now is the only important variable. This is the major difference between threshold scanning and grey scale scanning.

In grey scale scanning, logic 1 arming is done only once at the beginning of each series of scans. Since light energy can only quicken charge decay, grey scale scanning must be done during the increasing light ramp of the chopper waveform. If this was to be simulated during a decreasing light waveform, all cells must be rewritten with a Logic 1 before each frame read (starting out with a strong light will guarantee that all cells are quickly discharged). This overhead could be absorbed in variable threshold scanning since only four reads are necessary in each aperture cycle. In grey scale scanning, this overhead in time can not be tolerated.

c. For 500 dpi, 300 lpi, and variable threshold B/W scanning, this product can scan an 8½"×11" inch page in 18.7 seconds. Eight levels of brightness are supported.

Product 4 (Fixed Threshold B/W Scanner)

a. In fixed threshold B/W scanning, the illumination level is held constant while line scans execute at full speed. Since line numbers are scanned into the system as part of normal imaging information, the speed of document advance can be as fast as the line scan rate. Like the other products, a line scan is not performed until a new line number is sensed. For even lower cost in drive hardware, the document feed rate is designed to be ¼ the line scan speed. By holding this ratio, even velocity variations will not cause scanning difficulties. This feature is the key to a truly portable scanner that could be hand held.

b. At a line scan speed of 540 usec/line (discussed earlier), the document feed rate is set to be 4 times slower or 2.16 msec/line. With 300 lines per inch vertical resolution, the scan speed for a document will be 684 msec/inch.

c. For 500 dpi, 300 lpi, and fixed threshold B/W scanning, this product can scan an 8½"×11" document in only 7.13 seconds (648 msec/in×11 inches=7.13 seconds per page). This speed is believed to be faster than any optical-based scanner product on the market today.

d. For lowest possible cost, this product will use a fixed aperture instead of a chopper. But on advanced models using choppers, this high speed mode is supported. If chopper motion is stopped, it turns into a fixed aperture and will offer the same performance.

Product 5 (Portable Scanner)

a. Because of the simplicity of hardware and electronics necessary to produce the above products, all of these models can be manufactured as a light weight, compact size portable scanner that can support business activities on the move.

b. A truly portable B/W scanner wand with imbedded memory and serial communications is also now possible. In the normal mode, this scanner wand will scan 8½" page information into a computer from hard-to-manage materials such as thick books or catalogs. This capability exists in products today but are limited to only 4" of scan width and much lower resolution. As a portable scanner, it can be used in places such as a library to store important information that can be later retrieved and printed. Many professionals such as lawyers, publishers or even students will find this a powerful alternative when a copying machine is not available. With current memory technology, this portable scanner wand can easily store many pages of compressed code of text or images for later reproduction.

An example of a portable scanner is shown in FIGS. 21–22. In the illustrated embodiment, the scanner support 72a is made from a flexible material and tapers at one end 72b to form a flexible lip. the lip includes a curvature lock 73 that has two slideable elements that can be extended or retracted relative to one another to flex the flexible lip into a variety of curvatures to conform to curved surfaces to be scanned. For instance, the lip can be flexed to conform to the curvature of pages in an opened book 75 (FIG. 22).

Product 6 (Color Scanner)

COLOR SCANNER: The three primary colors: red, green and blue are scanned in succession with 16 levels of scaling for each color. From the "grey-level" or intensity of each primary color, the true pixel color can be digitized and recreated later with standard color printer technology.

To accomplish this, the scanning technique is basically the same as the 16-level grey scale product described previously. The main difference lies in the design of the chopper aperture blades. The front blade 100 (FIG. 26) is the same with one rectangular slot (not shown) in its center. The rear blade 102 (i.e. that blade closer to the light source), however, has three evenly spaced rectangular slots 104a–c. In each slot is mounted a different primary color filter. With the 0 degree point as a reference, the order of the color apertures will be red (104a), green (104b) and blue (104c).

Each document line will be scanned once for each primary color. To increase the speed of the scanning process, the reflectance fibers are split into 3 groups, each group scanning a 3" segment or 1,500 fibers. At 90 nanoseconds per fiber read, it will take 135 microseconds to read 1,500 fibers. The equivalent refresh time during the read process is now only 4.5 usec (135 usec/30). Exposure time, however, will be maintained at 135 microseconds. Each frame read now takes 270 usec. (135 usec+135 usec). With 8.5 degrees equalling 270 usec., the period to scan one primary color is 11.435 milliseconds (360/8.5×270 usec.). For three colors, the scan period of 34.305 milliseconds. This equates to a chopper period of 34.305 msec. or a frequency of 29.14 Hertz.

Sixteen levels of resolution for each primary color will yield a total of 4,096 (=16×16×16) color tones. Three dynamic RAMS are used; one for each 3" width of the document. The linear illumination fiber bundle does not have to be altered. Three "front end" electronic packages are necessary to support the 3 RAM sensors. Data processing, however, is accomplished with only one set of hardware identical to that used in other scanner models.

At 500 dpi, 300 lpi, and 4,096 color tones, the color scanner product can scan at 10.29 seconds per inch (34.305 msec×300). For an 8½"×11" document, the page scan time will be under 2 minutes (113.2 seconds). For lower resolution operation, 8 color levels will produce up to 512 color tones with a page scan time of 56.6 seconds. With the apertures stationary, B/W scanning using green light can be performed in only 7.13 seconds per page.

Figure 5:
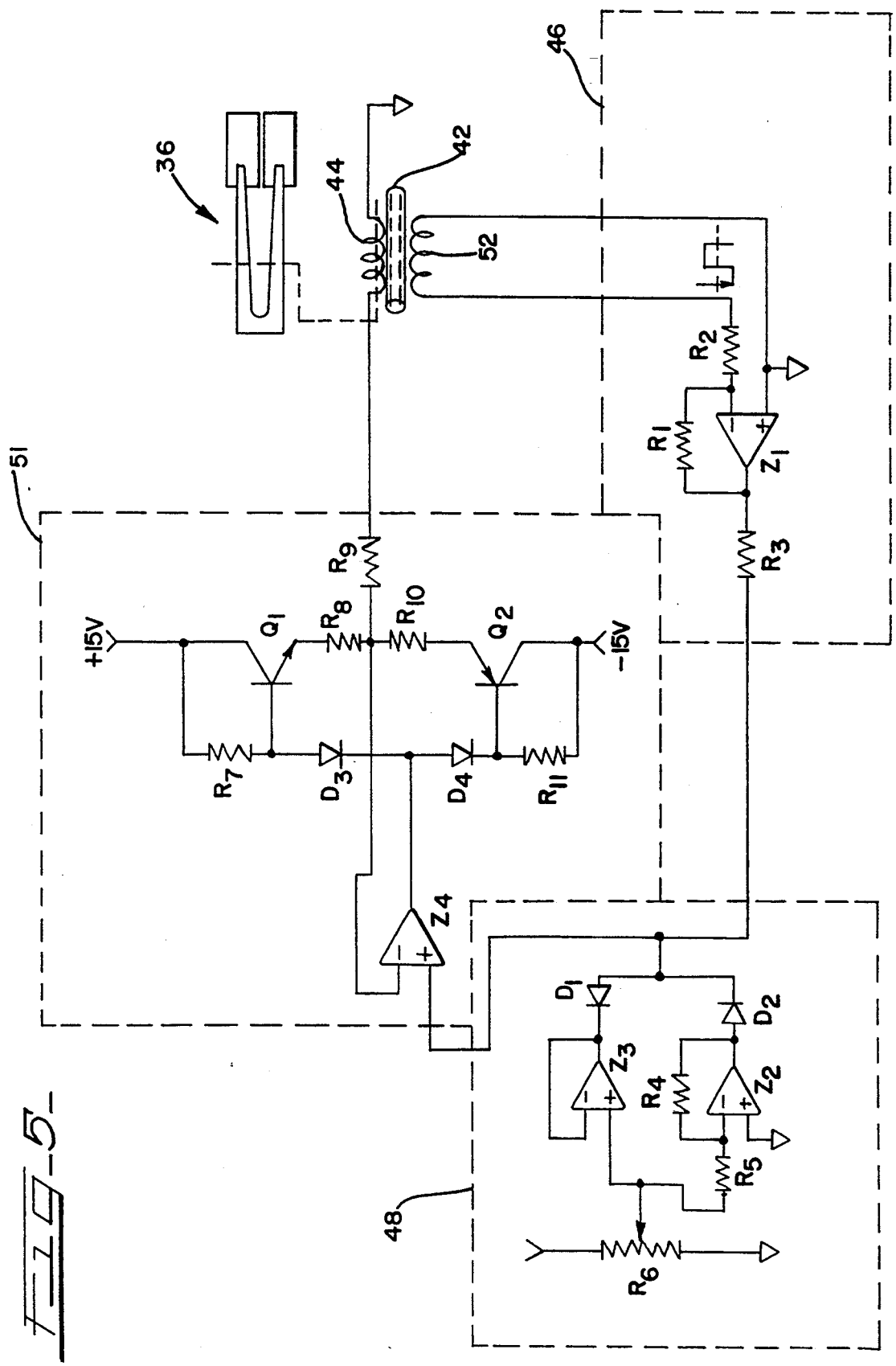
FIG. 5 is an electrical diagram of the circuitry employed in the optical scanner of the present invention.

The chopper driver circuit is illustrated in FIG. 5. The circuit is basically a conventional closed loop regenerative circuit that includes a high gain feedback coil amplifier 46, a limiting circuit 48, and an amplified voltage follower circuit 50. Amplifier 46 includes a feedback coil 52 that produces a signal having a frequency that is the resonant frequency of tuning fork 36. Amplifier 46 produces a square wave that is 180 degrees out of phase with the tuning fork motion. Amplifier 46 includes an amplifier $Z_1$ (a ¼ TL084 from Motorola) a 510k resistor $R_1$ and two 2k resistors $R_2$ and $R_3$.

Limiting circuit 48 controls the amplitude of the signal from amplifier 46 that is in turn amplified by the follower circuit 50. Limiting circuit 48 includes two amplifiers $Z_2$ and $Z_3$ (TL084), resistors $R_4$ and $R_5$ (each of which is 10k), a 10k variable resistor $R_6$, and two diodes D1 and D2 (IN914 from Motorola).

The limiting circuit is output coupled to the input of voltage follower circuit 50 that produces a square wave signal to drive coil 44 of chopper 36. Voltage follower circuit 50 includes an amplifier Z4 and two transistors $Q_1$ (a 2N222 from Motorola) and $Q_2$ (a 2N4121 from Motorola), two 3.01k resistors $R_7$ and $R_{11}$ and three 10k resistors $R_8$, $R_9$, and $R_{10}$. Diodes D3 and D4 are IN 914 from Motorola. Between the phasing of the feedback amplifier 46 and the voltage follower circuit 50, a total phase shift of 360 degrees is achieved. Thus, the output drive signal of voltage follower circuit 50 will positively reinforce itself.

This circuit produces a very precise frequency of operation since it is governed primarily by the natural resonant frequency of the chopper tuning fork. Standard crystal oscillators (e.g. in watches, radios etc.) work on similar principles, except a silicon crystal is used instead of a mechanical tuning fork.

In the preferred embodiment (FIG. 1), one section of transmitting and receiving fibers is dedicated to read a coded stripe 18 on the document drive platen 19B. The information on stripe 18 gives the line number on the paper drive being scanned. For color scanning, white balance control is also provided by this stripe. Since this encoding is done at the same time as image scanning, it inherently synchronizes the image scanning process to the feeding of the document through the machine, so the complete document can be scanned. Because of this, the document can even be pulled through the scanner by hand. Even where a mechanical document feeder is desired, the mechanism can be simple and inexpensive; a simple low cost synchronous AC motor 19A (FIG. 1) will suffice, for example.

A preferred method of making an optical scanning element 12 is illustrated in FIGS. 6-16. Optical (glass or plastic) fiber 54 (FIG. 6) is wound in a single layer 55 on a drum 56 that is rotated on a motorized shaft 58. Then, plastic strips 60 are adhered by fast cure, low viscosity adhesive 62 (FIGS. 7-9) to the wound fiber 55 along the longitudinal axis of drum 56 at locations 180 degrees apart from each other around the circumference of the drum. As shown in FIG. 9, two diagonal slices 64a and 64b are made with a knife 65 to release the wound fiber 55 from the drum in two identical bundles 66a and 66b. Each bundle 66 is held in a bundled form by a strip 60, and each is used for a separate optical scanning element 14.

A bundle 66 is placed in the bottom of a V-shaped female die 68 with strip 60 facing up (FIG. 10). A corresponding male die 70 is introduced into the female die to form the bundle in the vicinity of the strip 60 into a V-shape. Preferably, the dies are heated to mold strip 60 into a V shape, thereby retaining fibers 30 in that shape as well. For glass fibers, the die will first fracture the fibers along the proper line before the "V" bend is formed. Plastic (acrylic) fibers will bend. The V-shaped bundle is placed in a first rectangular mold (not shown), and a polymeric support 72 is molded around the V-shaped region of the bundle as shown in FIG. 11.

The ends 24b and 28b of fibers 30 are gathered into colletts 32 (round) and 34 (rectangular) respectively, and the colletts are mounted at either end of a second mold 74 that has an open bottom in which support 72 is positioned. As can be seen in FIGS. 11 and 12, the diagonal cuts made in releasing the wound fibers from drum 56 facilitate gathering the fibers into the colletts. The fibers progressively increase in length as the distance from the collett into which they must be gathered increases. This represents a savings in material since little fiber need be trimmed from the ends protruding from the colletts. A polymeric resin is placed in mold 74, and the mold is removed once the resin has solidified.

The portion 32 at the bottom of support 22 is then removed (FIGS. 3 and 13) to separate fibers 30 into transmitting fibers 24 and receiving fibers 28, but to leave the first ends 24a and 28a in close proximity. In the preferred embodiment, a plastic film 76 (FIGS. 14-15) is laminated onto the bottom of support 22. Plastic film 76 increases the wearability of scanner element 12, and it also allows good focus of the transmitting and receiving fibers. The film allows each transmitting fiber 24 to shine on a spot 78 (FIG. 15) that is the same spot where the receiving fibers 28 are oriented toward to receive reflected light from document 20. It is preferred that film 76 have a thickness of about 0.002 inches. As shown in FIG. 16, the light source 26 and the RAM 16 are mounted as described above after the protruding ends of the fibers are cut and polished. The light source 26 is mounted in a housing 27 with chopper 14, and RAM 16 is mounted in a housing 17.

An alternative construction of an optical scanning element is illustrated in FIGS. 24 and 25. Instead of two parallel rows of transmitting and receiving fibers, a single row 98 of fibers is used. Row 98 is separated between transmitting fibers 98a and receiving fibers 98b, each of which is preferably 0.002 inches in diameter. Every third fiber in row 98 is a transmitting fiber 98a so that each transmitting fiber 98a (designated "a" in FIG. 25) will illuminate the area underneath two adjacent receiving fibers 98b (designated "b") as shown in FIG. 25. This allows for lower manufacturing cost, but nonetheless, can achieve a 333 dpi resolution that can be scaled by conventional software to the current industry standard 150 or 300 dpi resolution.

A method of constructing the optical scanning element of FIGS. 24 and 25 is illustrated in FIGS. 27-34. A pair of fibers 98b from two supply rolls 106, 108 are wound onto a drum 110 such that a gap 112 (FIG. 28) is left between pairs of fibers 98b. Gap 112 is as wide as the diameter of a fiber. Then, a sheet (or separation layer) of mylar 114 (FIG. 29) is placed on drum 110 overlaying fibers 98b, except for an area 116 extending longitudinally of drum 110. Fiber 98a is then wound onto drum 110 such that in area 116, fiber 98a is wound into gaps 112.

In a groove 118 on area 116 on drum 110, a thermoplastic strip 120 (FIGS. 29-30) is placed before fibers 98b are wound onto the drum. After fibers 98b and 98a are wound onto the drum, a second thermoplastic strip 122 (FIGS. 30-31) is placed overlaying strip 120, and the two are heated so that the thermoplastic material flows between the fibers to create a unitary block of material 124 (FIG. 32).

Figure 33:
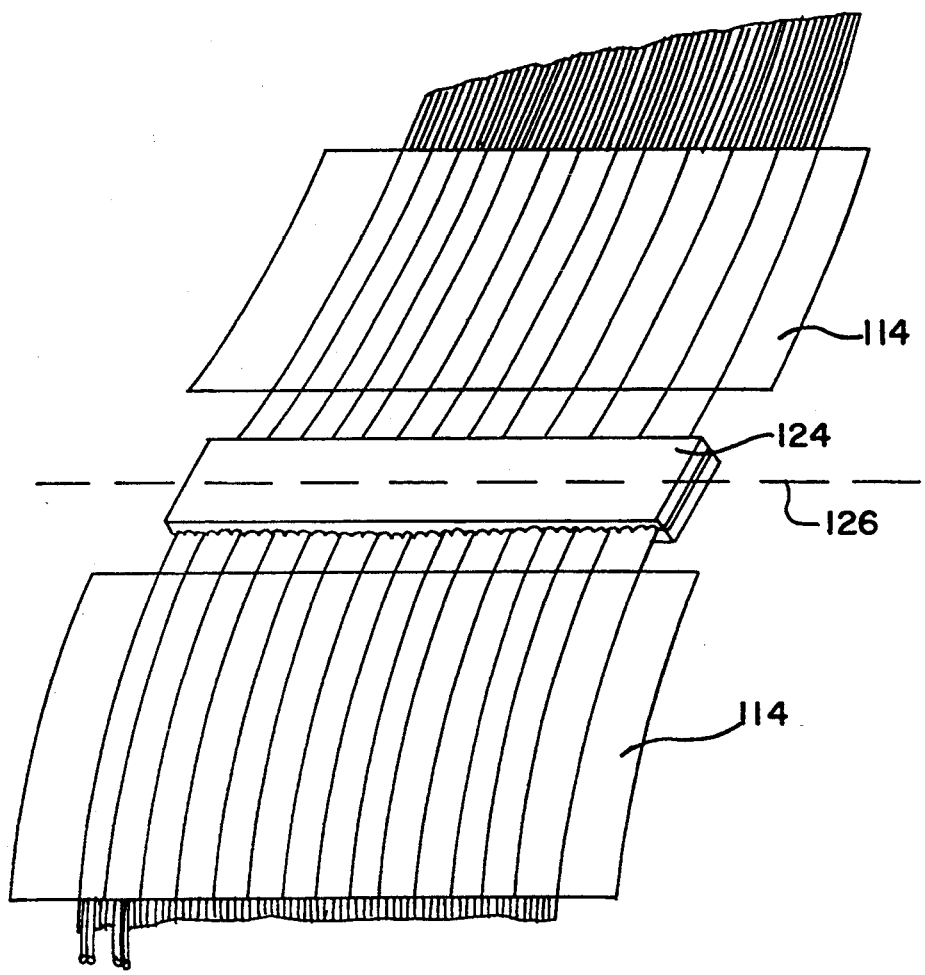
Figure 34:
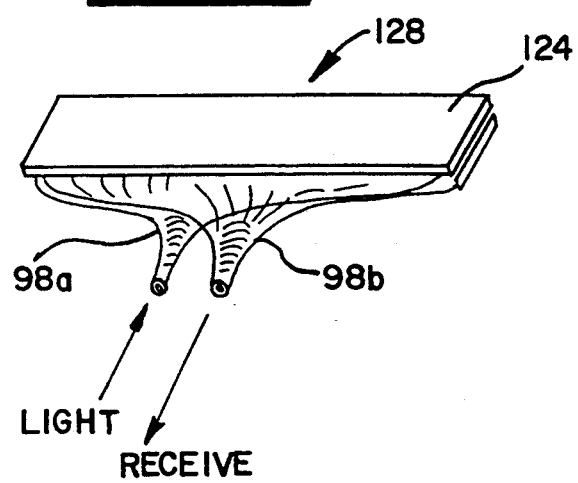

The fibers and sheet 114 are then cut from drum 110 as shown in FIG. 33. Sheet 114 thus separates fibers 98a from fibers 98b on either side of block 124. Block 124 is then cut with a precision saw longitudinally along line 126 to form two optical scanning elements. Fibers 98a and 98b are bundled as described previously on each scanning element 128 (FIG. 34).

The scanner of the present invention can be used in either facsimile or photocopy machines. As schematically shown in FIG. 17, the scanner of the present invention can be used in a facsimile machine by coupling the output of the scanner to a DRAM buffer circuit 78 that converts the output of the scanner to a digital form in a conventional fashion such that the output can be transmitted by a modem 80 to a receiving facsimile machine.

The facsimile machine of this invention is also provided with a document feed system or roller 79, a conventional thermal print system 81, all of which is powered with a conventional power supply 83.

The scanner of the present invention is used in a photocopy machine as shown in FIG. 18 in a fashion similar to a facsimile machine—by coupling the output of the scanner to a DRAM buffer circuit 78a that converts the output of the scanner to a digital form in a conventional fashion such that the output can be fed to a driver board of a conventional thermal printer assembly 81a.

While several embodiments of the current invention have been shown, others will be apparent to those of ordinary skill in the art. Such other embodiments are within the scope of this invention unless the claims that follow expressly state otherwise.

I claim:

1. A method of making an optical scanning element, comprising:

winding at least one optical fiber onto a cylindrical drum such that a plurality of coils of said optical fiber are formed on the drum;

adhering the coils of said fiber together;

removing the coils of said fiber from said drum and making at least one cut in the coils of said fiber;

positioning the coils of said fiber between V-shaped male and female dies to form them into a V shape;

molding a polymeric support around the coils of said fiber; and removing a portion of said polymeric support so as to cut the bottoms of said V-shaped coils of said fiber to separate those coils of said fiber into plural transmitting and receiving fibers.

2. The method of claim 1 that further includes adhering the coils of said fiber together by adhering a polymeric strip to the coils of said fiber, and positioning said polymeric strip along the bottom of said female die to retain the V shape imparted by said dies.

3. The method of claim 2 wherein at least one diagonal cut is made to release the coils of said fiber from said drum.

4. The method of claim 3 where at least two diagonal cuts are made.

5. The method of claim 1 wherein a translucent layer is applied to the ends of said transmitting and receiving fibers.

6. The method of claim 5 wherein said translucent layer comprises a glass slide.

* * * * *